(12) United States Patent
Kaufner

(10) Patent No.: US 10,177,638 B2
(45) Date of Patent: Jan. 8, 2019

(54) ROTOR POSITION ENCODER FOR AN ELECTRONICALLY COMMUTATED ELECTRIC MACHINE HAVING A REFERENCE ENCODER

(71) Applicant: Schaeffler Technologies AG & Co. KG, Herzogenaurach (DE)

(72) Inventor: Benjamin Kaufner, Stegaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 386 days.

(21) Appl. No.: 14/768,384

(22) PCT Filed: Jan. 29, 2014

(86) PCT No.: PCT/DE2014/200032
§ 371 (c)(1),
(2) Date: Aug. 17, 2015

(87) PCT Pub. No.: WO2014/131408
PCT Pub. Date: Sep. 4, 2014

(65) Prior Publication Data
US 2016/0003641 A1    Jan. 7, 2016

(30) Foreign Application Priority Data

Feb. 28, 2013    (DE) .................. 10 2013 203 388

(51) Int. Cl.
*H02K 29/08* (2006.01)
*H02P 6/16* (2016.01)
(Continued)

(52) U.S. Cl.
CPC .......... *H02K 29/08* (2013.01); *G01D 5/145* (2013.01); *H02K 1/27* (2013.01); *H02K 11/215* (2016.01); *H02P 6/16* (2013.01)

(58) Field of Classification Search
CPC ........ H02K 29/08; H02K 11/215; H02K 1/27; H02P 6/16; G01D 5/145
See application file for complete search history.

(56) References Cited

U.S. PATENT DOCUMENTS 5,177,417 A * 1/1993 Lee ................ H02P 6/16
                                                    318/400.02
6,329,782 B1 * 12/2001 Chen .............. B62D 5/046
                                                    318/727
(Continued)

FOREIGN PATENT DOCUMENTS

CN    102355182    2/2012
DE    10253388    6/2004
(Continued)

*Primary Examiner* — Mohamad Musleh
(74) *Attorney, Agent, or Firm* — Davidson, Davidson & Kappel, LLC

(57) ABSTRACT

A rotor position encoder (01) for an electronically commutated electric machine (02) having a stator and a rotor (03) and including a rotor position sensor (05) which is mounted on the stator so as to rotate therewith and has the purpose of detecting the rotational position of the rotor (03) with respect to the magnetic field of the stator, and a signal encoder (07) which is mounted on the rotor (03) so as to rotate therewith. The rotor position encoder is defined in that it has a reference encoder (08) for detecting reference values of the magnetic flux density of the rotor field, wherein the reference values (09) serve to determine an angular offset (11) between the signal encoder (07) and the position of the rotor (03). Furthermore, a method for determining an angular offset (11) between a signal encoder (07) of a rotor position encoder (01) and a rotor position of an electronically commutated electric machine (02) is provided.

10 Claims, 1 Drawing Sheet

(51) Int. Cl.
    *G01D 5/14*         (2006.01)
    *H02K 1/27*         (2006.01)
    *H02K 11/215*     (2016.01)

(56) References Cited

U.S. PATENT DOCUMENTS

| | | | |
|---|---|---|---|
| 6,400,109 B1 * | 6/2002 | Helmut | H02P 6/16 |
| | | | 318/400.11 |
| 6,925,412 B2 | 8/2005 | Rauer et al. | |
| 7,279,859 B2 | 10/2007 | Hill | |
| 7,423,396 B2 | 9/2008 | Bolt | |
| 7,965,004 B2 | 6/2011 | Hornberger | |
| 2004/0128106 A1 | 7/2004 | Rauer et al. | |
| 2009/0102460 A1 * | 4/2009 | Schott | G01D 5/244 |
| | | | 324/207.2 |
| 2010/0295389 A1 * | 11/2010 | Tessier | H02K 1/145 |
| | | | 310/46 |

FOREIGN PATENT DOCUMENTS

| | | |
|---|---|---|
| DE | 102004050999 A1 | 6/2005 |
| DE | 102005027775 A1 | 4/2006 |
| DE | 102006055305 A1 | 6/2007 |
| DE | 102008042829 | 4/2010 |
| DE | 102009001353 | 9/2010 |
| DE | 102011105502 | 1/2012 |
| DE | 102012204147 | 10/2012 |
| EP | 1420510 | 5/2004 |
| WO | WO2011/092320 | 8/2011 |

* cited by examiner

ROTOR POSITION ENCODER FOR AN ELECTRONICALLY COMMUTATED ELECTRIC MACHINE HAVING A REFERENCE ENCODER

The present invention relates to a rotor position encoder for an electronically commutated electric machine which includes a stator and a rotor. To begin with, the rotor position encoder includes, in the conventional manner, a rotor position sensor non-rotatably supported on the stator for the purpose of detecting the rotational position of the rotor with respect to the magnetic field of the stator, and a signal encoder, which is non-rotatably supported on the rotor. The electric machine is preferably designed as a motor, in particular a drive motor for vehicles.

Moreover, the present invention also relates to a method for ascertaining an angular offset between a signal encoder of a rotor position encoder and the position of a rotor with respect to the magnetic field of a stator of an electronically commutated electric machine.

BACKGROUND

To control electronically commutated electric machines, electric control variables are applied to the stator windings of the machine, as a function of the angle position of the rotor, for the purpose of driving the machine. The rotor position is generally detected with the aid of a rotor position encoder and supplied to a control unit for the purpose of generating the control signals needed to commutate the electric machine. Rotor position encoders supply either an analog electrical variable dependent on the position of the rotor, e.g., a voltage, signal pulses or a digitized indication of the absolute rotor position. Rotor position encoders are known from the prior art, in which a signal encoder (magnetic target), which is non-rotatably supported on the rotor, is read out with the aid of a magnetic field sensor non-rotatably supported on the stator.

DE 10 2009 001 353 A1 shows an electric machine, which includes a rotor having a rotor hub, a stator situated in a stator housing, a cover which is connected to the stator housing and extends to the inner diameter of the rotor hub and via which the rotor is supported with the aid of a rotor bearing. The electric machine has a rotor position sensor for detecting the rotational position of the rotor with respect to the magnetic field of the stator. The rotor position sensor is situated on the cover in the proximity of the rotor bearing in such a way that the rotor hub or a component which is non-rotatably connected to the rotor hub is used as the encoder track.

WO 2011/092320 A1 deals with a sensor unit for an electric machine, which includes a position sensor for providing an indication of the rotor position, a motor characteristic map unit having a motor characteristic map device for the purpose of modifying the indication of the rotor position according to a predefined motor characteristic map, as a function of the operating point, and an interface unit for the purpose of providing the modified indication of the motor position to a control unit For the zero position of the signal encoder of the rotor position encoder to match the defined zero position of the rotor, a corresponding angular offset must be stored in the control unit. The angular offset is generally ascertained for a concrete installation situation and stored in the control unit. To ascertain the latter, measuring methods are known which must be implemented in the control software of the control unit and which require certain operating states of the electric machine or may be carried out only in a repair shop. In known methods, the motor is driven to a minimum speed, which, in turn, makes it possible to compare the rotor position encoder sensor signal with the counter-EMF over a sufficiently long period of time in the undriven state and thus to determine the phase shift between the sensor signal and the real rotor position. If the position of the signal encoder (magnetic target) detected by the rotor position sensor with respect to the rotor changes, for example during replacement in the event of servicing, the stored offset value is no longer correct and must consequently be remeasured.

DE 10 2008 042 829 A1 describes a method and a device for compensating for the offset of a rotor position encoder of an electric machine, in which the points of intersection of the phase voltage signals of the electric machine are ascertained using comparators. The signals provided by the comparators are converted by a logic unit into a single-channel signal, which is supplied to a microcomputer. In the method, the rotor of the electric machine is accelerated to a predefined rotational speed with the aid of an injected rotating field. As soon as the rotor reaches the predefined rotational speed, the electric machine is switched to the free-wheeling state, a sinusoidal course of the phase voltages which are measurable at the machine terminals setting in. The offset of the rotor position encoder is ascertainable by comparing the phase voltages and the pulse sequences provided by the rotor position encoder.

DE 102 53 388 B4 shows a method for adjusting a sensor device for determining the rotational position of a rotor of an electronically commutated motor, in which the sensor device is mounted in a certain position relative to the rotor. The increments generated by the sensor device during one rotation of the rotor are detected. The motor is driven, and the voltages induced by the motor are detected, the angular position of the rotor and a sought commutation angle being derived from the induced voltages. The detected angular position is correlated with the increments of the sensor device. The correlation of the angular position and the increments of the sensor device are stored. One disadvantage of the described method is that it is also unable to be carried out during operation but requires a special adjusting device and thus makes it necessary to seek out a repair shop.

DE 10 2012 204 147 A1 shows a method for controlling an electronically commutated electric motor having multiple phases in a drive system of a motor vehicle, which includes a rotor and an absolutely measuring rotor position sensor, which monitors the rotation angle of the rotor, and an electronic system for commutating the electric motor on the basis of detected data of the rotation angle of the rotor position sensor. A plausibility check takes place regularly over the service life of the electric motor by setting a predefined actual position of the rotor position while the electric motor is stopped. For this purpose, phases u, v, w are simultaneously applied to current coils situated in a stationary manner in the stator, so that a stationary magnetic field sets in, toward which the pole pair is oriented and thereby positions the rotor exactly in the predefined actual position. This actual position is compared with a test position detected by the rotor position sensor. Taking into account an angular offset, which may have already been ascertained in the factory, the actual position and the test position are compared with each other and checked for the exceeding of a limiting value. The plausibility check may be carried out, for example, when the motor vehicle is started.

A method is known from DE 10 2011 105 502 A1 for compensating for a phase shift between a rotor position sensor and a rotor position of an electronically commutated motor, which may be carried out both during startup and during operation of the motor. The position of the rotor is measured with the aid of an absolute value rotor position sensor, which is compared with a motor parameter which characterizes the expected position of the rotor. The phase shift which occurs, for example, during assembly of the motor and the rotor position sensor, may be automatically corrected hereby, even during operation. During the operation of the motor, the motor is activated with the aid of a block commutation, in which one phase is always current-free. The phase voltage at the current-free phase is measured. At the point where the zero crossing of the phase voltage is situated, the latter is aligned with the position which the absolute value rotor position sensor measures. A piece of information about the position of the rotor is established via the phase voltage. To determine whether a phase shift is present, the position actually determined is compared with an expected value of the rotor position. The described method requires the provision of corresponding software functions in the control unit for ascertaining the angular offset.

SUMMARY OF THE INVENTION

The object of the present invention is to provide a rotor position encoder for an electronically commutated electric machine, whose angular offset is available continuously and updated during operation of the electric machine, no additional software complexity being required in the control unit for ascertaining the angular offset. Furthermore, a method for ascertaining an angular offset between a signal encoder of a rotor position encoder and the position of a rotor with respect to the magnetic field of a stator of an electronically commutated electric machine is also to be provided.

The present invention provides a rotor position encoder. In addition to the known rotor position sensor including an associated signal encoder, the rotor position encoder according to the present invention also includes a reference encoder for detecting reference values of the magnetic flux density of the rotor field, the reference values being used to ascertain an angular offset between the signal encoder of the rotor position encoder and the position of the rotor.

One great advantage of the approach lies in the fact that reference values are continuously available during the operation of the electric machine, which may be compared with the signal values detected by the rotor position encoder to be able to determine an instantaneous angular offset. In this way, an instantaneous angular offset is always available, which may be taken into account during the commutation. Compared to the previously known approaches, it is thus no longer necessary to determine the angular offset with complex means by using methods to be additionally implemented in the control software. An involvement of a repair shop, which up to now has been frequently necessary in this connection, is eliminated, which results not least in time and cost savings.

According to one preferred specific embodiment, the reference encoder is used to detect the zero crossing of the flux density, at which the absolute value of the rotor field is zero. In alternative specific embodiments, the maxima or minima of the flux density may also be determined with the aid of the reference encoder. For this purpose, the sensor signal supplied by the reference encoder is triggered upon characteristic flux density changes in the time range.

According to one advantageous specific embodiment, the reference encoder is a Hall sensor. The rotor position sensor may also be designed as a Hall sensor. Hall sensors have long been used for magnetic field measurements and do not require any explanation in greater detail with regard to their use.

The object of the present invention is also achieved by a method for ascertaining an angular offset between a signal encoder of a rotor position encoder and the actual position of a rotor with respect to the magnetic field of a stator of an electronically commutated electric machine.

In the method according to the present invention, reference values of the magnetic flux density of the rotor field are detected and compared with the signal values simultaneously detected by the rotor position encoder. As a result of this comparison, an angular offset between the signal encoder of the rotor position encoder and the rotor may be ascertained, which may then be taken into account during the commutation.

The ascertainment of the angular offset preferably takes place during the normal operation of the electric machine. Compared to the methods common today, no special operating states of the motor have to be induced to ascertain the angular offset.

The ascertained angular offset is transmitted to a control unit, which then further processes it accordingly to allow the incorporation of the instantaneous angular offset during the generation of the control signals needed for the commutation of the electric machine.

One preferred specific embodiment of the present invention is explained in greater detail below on the basis of FIGS. 1 and 2.

DETAILED DESCRIPTION

Figure 1:
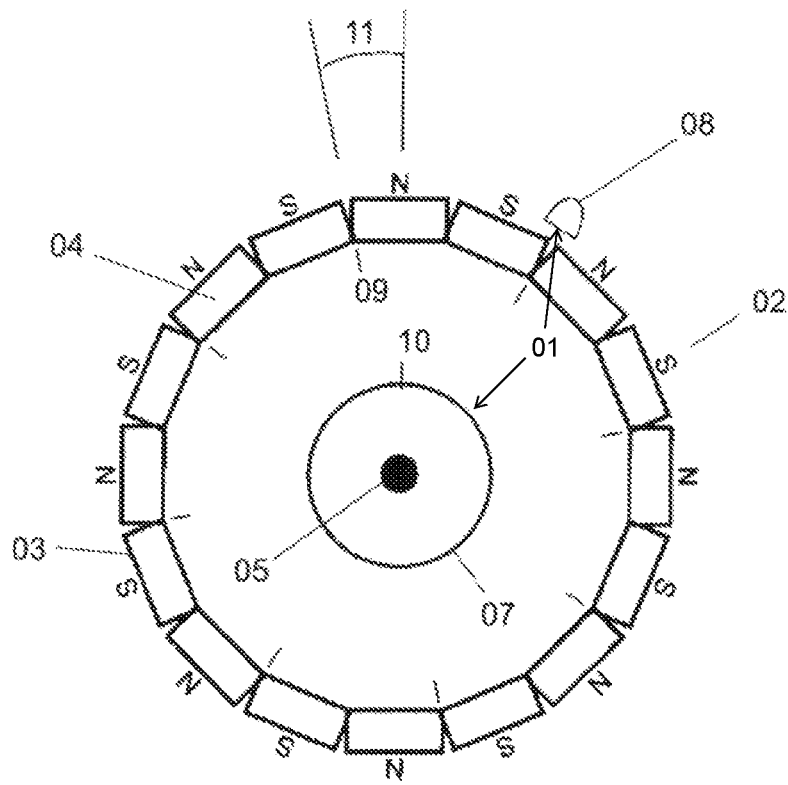
FIG. 1 shows the basic structure of a rotor position encoder which is installed in an electronically commutated electric machine.

FIG. 1 shows the basic structure of a rotor position encoder according to the present invention, which is installed in an electronically commutated electric machine 02. Electric machine 02 is preferably designed as a permanently excited electric motor and includes a rotor 03 and a stator 12 (FIG. 2), only rotor 03 being illustrated in FIG. 1. Rotor 03 includes a large number of permanent magnets 04.

Figure 2:
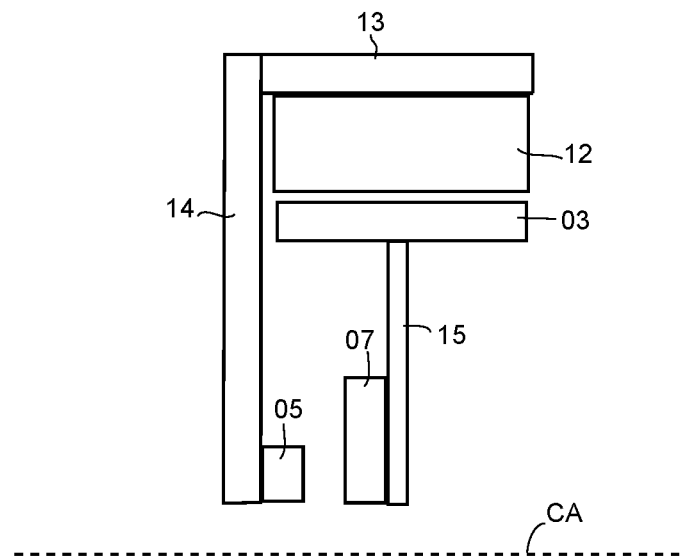
FIG. 2 schematically shows a cross-sectional side view of the electronically commutated electric machine.

The rotor position encoder according to the present invention includes a rotor position sensor 05, which is non-rotatably supported on the stator housing 13 (FIG. 2). In electric motors, the supporting of the rotor 03 may take place via a cover 14 connected to the stator housing 13, which runs radially past permanent magnets 04 of rotor 03 all the way to the inner diameter of the rotor hub 15. Rotor position sensor 05 may be, for example, non-rotatably fixed on this cover connected to the stator housing. The rotational position of rotor 03 with respect to the magnetic field of the stator 12 may be detected with the aid of rotor position sensor 05. Rotor position sensor 05 used is a magnetic field sensor, a Hall sensor preferably being used.

The rotor position encoder according to the present invention furthermore includes a signal encoder 07, which is supported on rotor 03 and rotates together therewith. Signal encoder 07 is preferably designed as a magnetic target. To generate a commutation signal, magnetic target 07 is read out by rotor position sensor 05.

To compensate for an angular offset between signal encoder 07 of the rotor position encoder and the true position of rotor 03, according to the present invention, a continuous or repeated determination of this angular offset takes place during the operation of electric motor 02. The rotor position encoder according to the present invention is equipped with a reference encoder 08 for this purpose. Any magnetically sensitive sensor, for example a Hall sensor, may be used as reference encoder 08. Reference encoder 08 is situated near permanent magnets 04 of rotor 03. During each rotation of the rotor, reference encoder 08 generates a reference signal, which represents one reference position of rotor 03. According to one preferred embodiment, this reference position 09 is a position at which the absolute value of the rotor field is precisely zero (zero crossing of the flux density). By comparing the reference signal with the signal course generated by rotor position encoder 01 (zero position 10 of signal encoder 07), a possibly existing angular offset 11 between signal encoder 07 of rotor position encoder 01 and rotor 03 may be ascertained, which may be transmitted to a control unit to be able to take it into account during the commutation.

The angular offset does not have to be continuously determined during the operation of the motor, since it does not change a great deal under normal operating conditions. The offset may be redetermined at any time, for example when restarting the motor, after elevated load peaks, after servicing or the like.

In alternative specific embodiments, the maxima or minima of the flux density may be determined instead of the zero crossing of the flux density.

LIST OF REFERENCE NUMERALS

01 rotor position encoder
02 electric machine
03 rotor
04 permanent magnets
05 rotor position sensor
07 signal encoder
08 reference encoder
09 reference position (rotor zero)
10 zero position of the signal encoder
11 angular offset
12 stator
13 stator housing
14 cover
15 rotor hub

What is claimed is:

1. A rotor position encoder for an electronically commutated electric machine having a stator and a rotor, the rotor position encoder comprising:
a rotor position sensor configured for being non-rotatably supported on the stator, the rotor position sensor being configured for detecting a rotational position of the rotor with respect to the magnetic field of the stator;
a signal encoder configured for being fastened to the rotor and rotating with the rotor; and
a reference encoder for detecting reference values of magnetic flux density of a rotor field, the reference values being used to ascertain an angular offset between the signal encoder and the position of the rotor.

2. The rotor position encoder as recited in claim 1 wherein the reference encoder is used to detect a zero crossing or a maxima or a minima of the flux density.

3. The rotor position encoder as recited in claim 1 wherein at least one of the reference encoder or the rotor position sensor is a Hall sensor.

4. A permanently excited electric motor comprising the rotor position encoder as recited in claim 1.

5. The permanently excited electric motor as recited in claim 4 wherein the reference encoder is situated on the stator opposite permanent magnets of the rotor.

6. A method for ascertaining an angular offset between a signal encoder of a rotor position encoder and a true position of a rotor with respect to the magnetic field of a stator of an electronically commutated electric machine, the method comprising:
detecting reference values of the magnetic flux density of the rotor field by a reference encoder independently of the signal encoder, and
performing a comparison of the reference values with the signal values simultaneously detected by the signal encoder for the purpose of ascertaining the angular offset.

7. The method as recited in claim 6 wherein the reference values are detected with the aid of a reference encoder designed as a magnetic field sensor.

8. The method as recited in claim 6 wherein the method takes place during normal operation of the electric machine.

9. The method as recited in claim 6 wherein the ascertained angular offset is transmitted to a control unit.

10. The method as recited in claim 6 wherein a zero crossing of the flux density of the rotor field is detected by the reference encoder as the reference value.

\* \* \* \* \*